US012798530B2

(12) United States Patent
Drelich et al.

(10) Patent No.: US 12,798,530 B2
(45) Date of Patent: Nov. 17, 2026

(54) TRACTOR PROTECTION VALVE AND TRAILER CONTROL MODULE FOR A VEHICLE, AND ASSOCIATED METHOD OF MANUFACTURING

(71) Applicant: ZF CV Systems Europe BV, Brussels (BE)

(72) Inventors: Lukasz Drelich, Wroclaw (PL); Pawel Swiatek, Wroclaw (PL); Rafal Wardega, Wroclaw (PL)

(73) Assignee: ZF CV Systems Europe BV, Brussels (BE)

( * ) Notice: Subject to any disclaimer, the term of this patent is extended or adjusted under 35 U.S.C. 154(b) by 350 days.

(21) Appl. No.: 18/436,279

(22) Filed: Feb. 8, 2024

(65) Prior Publication Data

US 2025/0256691 A1 Aug. 14, 2025

(51) Int. Cl.

*B60T 13/68* (2006.01)
*B60T 7/20* (2006.01)
*B60T 8/18* (2006.01)
*B60T 13/26* (2006.01)

(52) U.S. Cl.

CPC .......... *B60T 8/1887* (2013.01); *B60T 13/683* (2013.01); *B60T 13/268* (2013.01)

(58) Field of Classification Search

CPC .... B60T 8/1887; B60T 13/683; B60T 13/268; B60T 13/263; B60T 8/323; B60T 7/20
See application file for complete search history.

(56) References Cited

U.S. PATENT DOCUMENTS 2,136,578 A * 11/1938 Campbell ............... B60T 8/285 303/24.1
2,645,307 A * 7/1953 Stegman ................. B60T 15/18 303/29
2,645,308 A * 7/1953 Fitch ....................... B60T 15/18 303/29
2,850,330 A * 9/1958 Andrews ............... B60T 13/403 303/29
2,979,069 A * 4/1961 Valentine .............. B60T 13/403 303/29
3,746,401 A * 7/1973 Stearns ................. B60T 13/263 303/71
3,951,463 A * 4/1976 Fannin .................. B60T 13/268 303/68
8,267,107 B2 * 9/2012 Ho ............................ F15D 1/00 137/625.26
8,297,713 B2 * 10/2012 Soupal .................. B60T 8/1708 303/123

(Continued)

*Primary Examiner* — Thomas W Irvin
(74) *Attorney, Agent, or Firm* — Dickinson Wright PLLC

(57) ABSTRACT

A tractor protection valve (100) for a trailer control module (150) of a vehicle (200*a*), in particular utility vehicle (200*b*) includes a pressure chamber (110), a delivery port (111), and a control port (112). A first fluid channel (121) fluidly connects the pressure chamber (110) and the delivery port (111), and a second fluid channel (122) fluidly connects the delivery port (111) and the control port (112). The pressure chamber (110), the delivery port (111), and the control port (112) are collinearly arranged, and each of the first fluid channel (121) and the second fluid channel (122) extend along a common axis (A). The first and second fluid channels (121, 122) may be formed in a single drilling step, from the pressure chamber (110), through the delivery port (111), and to the control port (112).

16 Claims, 2 Drawing Sheets

(56) References Cited

U.S. PATENT DOCUMENTS

| | | | | |
|---|---|---|---|---|
| 10,315,636 | B2 * | 6/2019 | Koelzer | B60T 13/263 |
| 12,202,451 | B2 * | 1/2025 | Drelich | B60T 13/403 |
| 2015/0246665 | A1 * | 9/2015 | Postler | B60T 13/44<br>60/547.1 |
| 2018/0079396 | A1 * | 3/2018 | Leonard | B60T 13/665 |
| 2018/0334151 | A1 | 11/2018 | Eckert et al. | |
| 2023/0130519 | A1 * | 4/2023 | Drelich | B60T 8/885<br>303/7 |
| 2024/0190410 | A1 * | 6/2024 | Komandur | B60T 13/662 |
| 2025/0010827 | A1 * | 1/2025 | Drelich | B60T 13/263 |
| 2025/0010838 | A1 * | 1/2025 | Kuncewicz | B60T 7/20 |

* cited by examiner

PRIOR
ART

TRACTOR PROTECTION VALVE AND TRAILER CONTROL MODULE FOR A VEHICLE, AND ASSOCIATED METHOD OF MANUFACTURING

FIELD

The disclosure relates to a tractor protection valve for a trailer control module of a vehicle, in particular a utility vehicle, where the tractor protection valve includes a pressure chamber; a delivery port; a control port; a first fluid channel fluidly connecting the pressure chamber and the delivery port; and a second fluid channel fluidly connecting the delivery port and the control port. The disclosure further relates to a trailer control module for a vehicle, in particular a utility vehicle, having a tractor protection valve, and to a vehicle, in particular a utility vehicle, having a tractor protection valve and/or a trailer control module, and further to a method of manufacturing a tractor protection valve.

BACKGROUND

Vehicles, in particular utility vehicles, are regularly equipped with pneumatic braking systems, also called air brake systems. In a vehicle combination of a tractor vehicle and a trailer, a so-called tractor-trailer combination, pressurized air and brake signals are supplied from the tractor vehicle to the trailer. Pressurized air is supplied to the trailer via a trailer supply line and pneumatic control signals are transmitted via a control line. For connecting the supply and control lines of a trailer, the pneumatic braking system of the tractor vehicle usually includes two coupling heads.

Both coupling heads may have an open design, i.e., a design without check-valves. To prevent leakage when no trailer is connected to the coupling heads further measures are required. Therefore, the coupling heads are connected to a tractor protection valve (TPV), which protects the pneumatic braking system while no trailer is connected, during a trailer breakaway, and/or when severe air leakage develops in the trailer.

In normal use the tractor protection valve is used to shut off the trailer control line before disconnecting the trailer from the pneumatic braking system of the vehicle. If the supply line to the tractor is disconnected in an emergency, the tractor protection valve closes and prevents leakage of air from a control line of the pneumatic braking system. Therefore, the pneumatic braking system of the tractor remains pressurized and retains its functionality.

Leakage from the supply line is usually prevented by a push-pull-valve or dash-valve. When being in a pushed position the dash valve allows pressurized air to flow from a pressurized air supply of the tractor to the air supply line of the trailer. When a pressure in the supply line of the tractor drops below a predefined threshold, the dash-valve pops out and closes off the supply of pressurized air to the trailer.

Pneumatic tractor protection valves are commonly used in commercial vehicles such as towing trucks and tractors. For example, a tractor protection valve may be a purely pneumatic valve which is not configured to modulate the pressure supplied to the trailer. Control pressure at one of its inlets is supplied to the trailer control outlet as long as a trailer supply pressure is supplied to the trailer. Such trailer protection valves are typically comprised by a trailer control module (TCM).

For example, American Federal Motor Vehicle Safety Standard FMVSS-121 standard applies to trucks, buses, and trailers equipped with air brake systems, and establishes performance and equipment requirements for braking systems on vehicles equipped with air brake systems, including separately controlled parking brakes of prescribed holding capability, automatic brake adjusters and adjustment indicators, and emergency brakes which activate automatically in the event of loss of air pressure.

US 2023/0130519 A1 discloses an electropneumatic trailer control module includes a trailer control connection configured to deliver a trailer control pressure, an electropneumatic trailer control valve arrangement configured to receive a supply pressure and to provide the trailer control pressure and an electronic trailer control connection for providing trailer braking control signals such that the trailer control pressure can be modulated. The electropneumatic trailer control module is characterized by a protection connection for receiving a pneumatic protection pressure, and a tractor protection unit configured to switch between a supply state and a protection state. The invention further relates to an electropneumatic braking system, a vehicle, and a method for controlling a trailer supply function of an electropneumatic braking system.

US 2018/334151 A1 discloses an electro-pneumatic tractor protection valve assembly including a trailer supply input for receiving a supply pressure, a trailer service output for delivering a trailer supply pressure, a first supply input for receiving a primary driver brake pressure, a second supply input for receiving a secondary driver brake pressure, a dual brake valve actuated by a brake pedal and supplying the brake control pressures, a vent opening for venting an internal conduit, a first electrically controlled pneumatic valve to receive a first electric control signal for trailer assistance braking, and a trailer control output for delivering a trailer brake control pressure. The valve assembly includes one single casing accommodating the first supply input, the second supply input, the trailer supply input, the trailer control output, the vent opening, and the trailer service output.

In the prior art, a tractor protection valve requires, for example, three drills to provide fluid channels to pneumatically connect the pneumatic control chamber and two of the ports of the tractor protection valve.

However, the machining process is cost-intensive and difficult, because it is necessary to drill two angular holes that comprise two drilling axes which enclose a specific angle with each other to meet at the end of the holes. Further a specific airflow diameter is to be obtained. The solution with the three drills requires construction space and implies a respective amount of material that is to be removed. This increases the cost and causes material accumulation in casting. Further, the area and/or section of the valve where the holes meet has been identified as risky since leakage could be caused by the porosity of the material and a pneumatic chamber is close to the drill area.

SUMMARY

In the light of the prior art, an object of the present disclosure is to provide a contribution to the prior art, and to provide a device being suitable for improving at least one of the above-mentioned aspects of the prior art, respectively. In particular, it is an object of the disclosure to provide a cost-effective, reliable, and efficiently machinable tractor protection valve.

The object is solved by the features of the present disclosure described herein. The present disclosure also describes further embodiments.

According to an aspect of the present disclosure, a tractor protection valve for a trailer control module of a vehicle, in particular utility vehicle, is provided, wherein the tractor protection valve comprises: a pressure chamber; a delivery port; a control port; a first fluid channel fluidly connecting the pressure chamber and the delivery port; and a second fluid channel fluidly connecting the delivery port and the control port; wherein the pressure chamber, the delivery port and the control port are collinearly arranged; and each of the first fluid channel and the second fluid channel extend along a common axis.

The present disclosure has realized that the pressure chamber, the delivery port, and the control port may be collinearly arranged, i.e., the pressure chamber, the delivery port, and the control port are arranged at the same line or essentially at the same line. This arrangement provides that the first fluid channel and the second fluid channel extend along a common axis while interconnecting the pressure chamber, the delivery port, and the control port. Therein, the common axis may coincide with the line at which the pressure chamber, the delivery port, and the control port are arranged. Therein, the axis may define a principal elongation direction of the first fluid channel and/or of the second fluid channel, which may coincide with the streaming direction of pressurized air through the first fluid channel and/or of the second fluid channel.

The collinear arrangement of the pressure chamber, the delivery port, and the control port and the common axis of the first fluid channel and the second fluid channel provides that the first fluid channel and the second fluid channel may be machined in a single step, e.g., with a single drilling step.

The present disclosure may thus reduce the complexity of manufacturing the tractor protection valve, may require less construction space, and may improve the quality of the part, e.g., in avoiding leakage problems. Further, it is possible to arrange the pressure chamber, the delivery port, and the control port so that no drilling is needed: e.g. the ports can be opened and connected to the pressure chamber during a milling operation for manufacturing a body of the tractor protection valve.

Optionally, the tractor protection valve comprises a body, and the delivery port and/or the control port is arranged at an outer section of the body. This may enable an effective fitting of the respective port with a pneumatic pipe.

Optionally, the delivery port is arranged between the pressure chamber and the control port. This order may be functionally advantageous for the transmission of pressurized air. Alternatively, the order may be different, i.e., the order of the pressure chamber, the delivery port, and the control port may be arbitrary.

According to an aspect of the present disclosure, a trailer control module for a vehicle, in particular utility vehicle, is provided, wherein the trailer control module comprises the tractor protection valve as described above. Optionally, the trailer control module and/or its tractor protection valve comprises one or more optional features as described above to achieve a technical effect corresponding thereto.

Optionally, the first fluid channel and/or the second fluid channel is arranged so that a body of the tractor protection valve and a cover of the trailer control module separates the respective fluid channel from an environment of the trailer control module. This may enable a particular efficient manufacturing of the tractor protection valve, because drilling holes which need to be closed to separate the fluid channels from the environment is avoided.

According to an aspect of the present disclosure, a vehicle, in particular a utility vehicle, is provided, wherein the vehicle, in particular the utility vehicle comprises the tractor protection valve as described above. Optionally, the vehicle, in particular the utility vehicle, comprises the trailer control module as described above. Optionally, the trailer control module and/or the tractor protection valve comprises one or more optional features as described above to achieve a technical effect corresponding thereto.

According to an aspect of the present disclosure, a method of manufacturing the tractor protection valve as described above is provided, wherein the method comprises the steps of: providing the tractor protection valve with the pressure chamber, the delivery port, and the control port, wherein the pressure chamber, the delivery port and the control port are collinearly arranged; and machining the tractor protection valve so that each of the first fluid channel and the second fluid channel extend along a common axis. Optionally, the method is performed so as to realize one or more optional features of the tractor protection valve to achieve a technical effect corresponding thereto.

Optionally, machining comprises drilling. Therein, it is realized that drilling, in particular a single drilling step, may be sufficient to efficiently manufacture the fluid channels and thus to interconnect the pressure chamber, the delivery port and the supply port. Optionally, one of the ports can be connected directly in casting with the pressure chamber. In that case, just one drill is needed to connect the other of the ports with the pressure chamber.

Optionally, drilling is performed in one step from the pressure chamber via the delivery port to the control port. Therein, drilling from the pressure chamber via the delivery port to the control port is efficiently performable and enables, due to the space provided in the area of the pressure chamber, an appropriate amount to arrange and/or orientate a drilling tool appropriately.

Optionally, the delivery port or the control port are arranged on a back side of the tractor protection valve. In that case, drilling may be performed from one of the ports, via the pressure chamber to the other of the port.

BRIEF DESCRIPTION OF THE DRAWINGS

An embodiment according to an aspect of the present disclosure is described with reference to the Figures below.

DETAILED DESCRIPTION

In the following embodiments are described with reference to the Figures, wherein the same reference signs are used for the same objects throughout the description of the Figures and wherein the embodiment is just one specific example for implementing the disclosure and does not limit the scope of the invention as defined by the claims.

Figure 1:
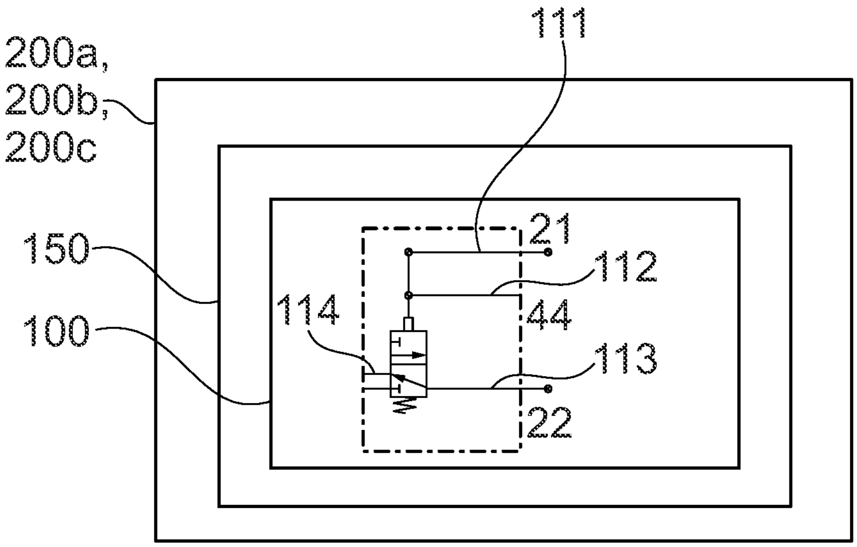
FIG. 1 is a schematic view of a vehicle, in particular utility vehicle, according to an embodiment of the disclosure.

FIG. 1 shows schematically a vehicle 200*a*, in particular utility vehicle 200*b*, according to an embodiment of the disclosure. In the following, the vehicle 200*a*, in particular utility vehicle 200*b*, is referred to as vehicle 200*a*, 200*b*.

The vehicle 200*a*, 200*b* is a land vehicle. The vehicle 200*a*, 200*b* is a tractor vehicle 200*c* of a tractor-trailer combination.

The vehicle 200*a*, 200*b*, includes a trailer control module 150. The trailer control module 150 is adapted to supply and control a pneumatic braking system of a trailer of the vehicle 200*a*, 200*b*.

The trailer control module 150 and thus the vehicle 200*a*, 200*b* includes a tractor protection valve 100. The tractor protection valve 100 includes a pressure chamber 110 (see FIG. 4), a delivery port 111, a control port 112, a second delivery port 113 and an exhaust port 114. Therein, the exhaust port 114 is optional and may be dispensed with.

The tractor protection valve 100 is further described with reference to FIGS. 3 and 4. Prior art is described with reference to FIG. 2.

Figure 2:
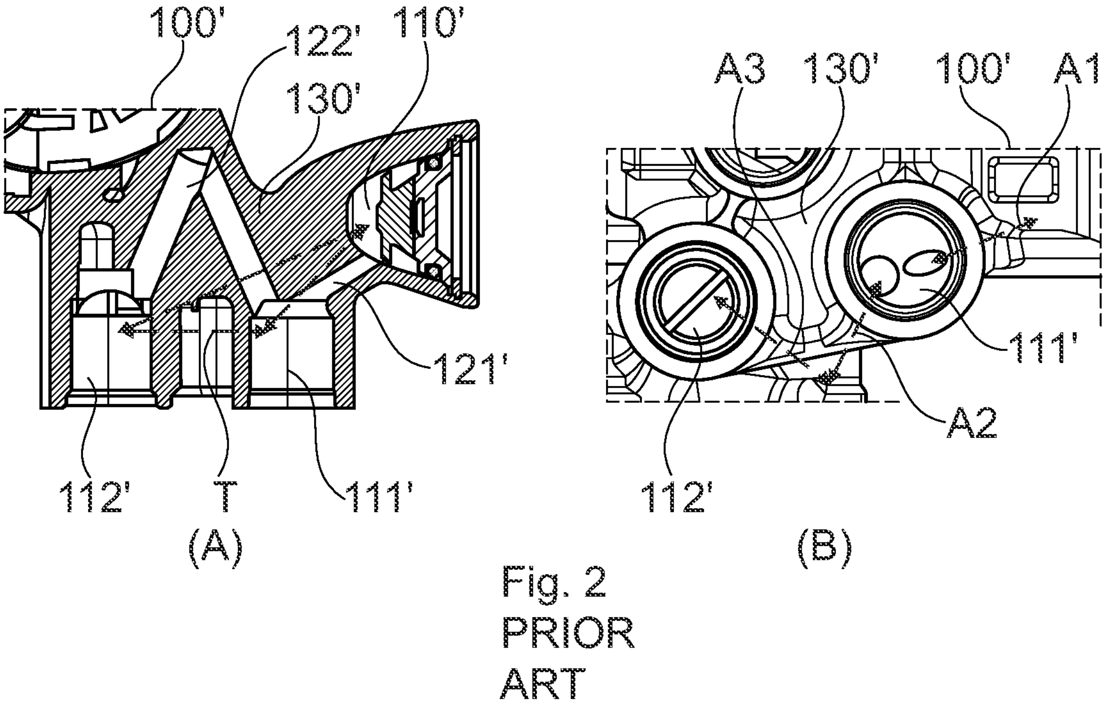
FIG. 2 illustrates a tractor protection valve according to the prior art.

FIG. 2 shows a prior art tractor protection valve 100' according to the prior art. Therein, FIG. 2 (A) shows a sectional view of the prior art tractor protection valve 100' and FIG. 2 (B) shows a detail of the tractor protection valve 100'.

The prior art tractor protection valve 100' of FIG. 2 may also be used for a trailer control module 150 of a vehicle 200*a*, 200*b* as explained with reference to FIG. 1.

The prior art tractor protection valve 100' also comprises: a pressure chamber 110', a delivery port 111' and a control port 112'. The pressure chamber 110', the delivery port 111' and the control port 112' are arranged, in the view of FIG. 2 (A) on a triangle T. The triangle T is arranged in the drawing plane of FIG. 2 (A).

The prior art tractor protection valve 100' comprises further a first fluid channel 121' fluidly connecting the pressure chamber 110 and the delivery port 111'. Therein, the first fluid channel 121' may be manufactured by a first drilling step along a first drilling axis A1, see FIG. 2 (B).

The prior art tractor protection valve 100' comprises further a second fluid channel 122' fluidly connecting the delivery port 111' and the control port 112'. Therein, the second fluid channel 122' may be manufactured by a second drilling step along a second drilling axis A2 and a third drilling step along a third drilling axis A3, see FIG. 2 (B). The second drilling step and the third drilling step are typically challenging. The first drilling axis A1, the second drilling axis A2, and the third drilling axis A3 are pairwise different from each other.

Figure 3:
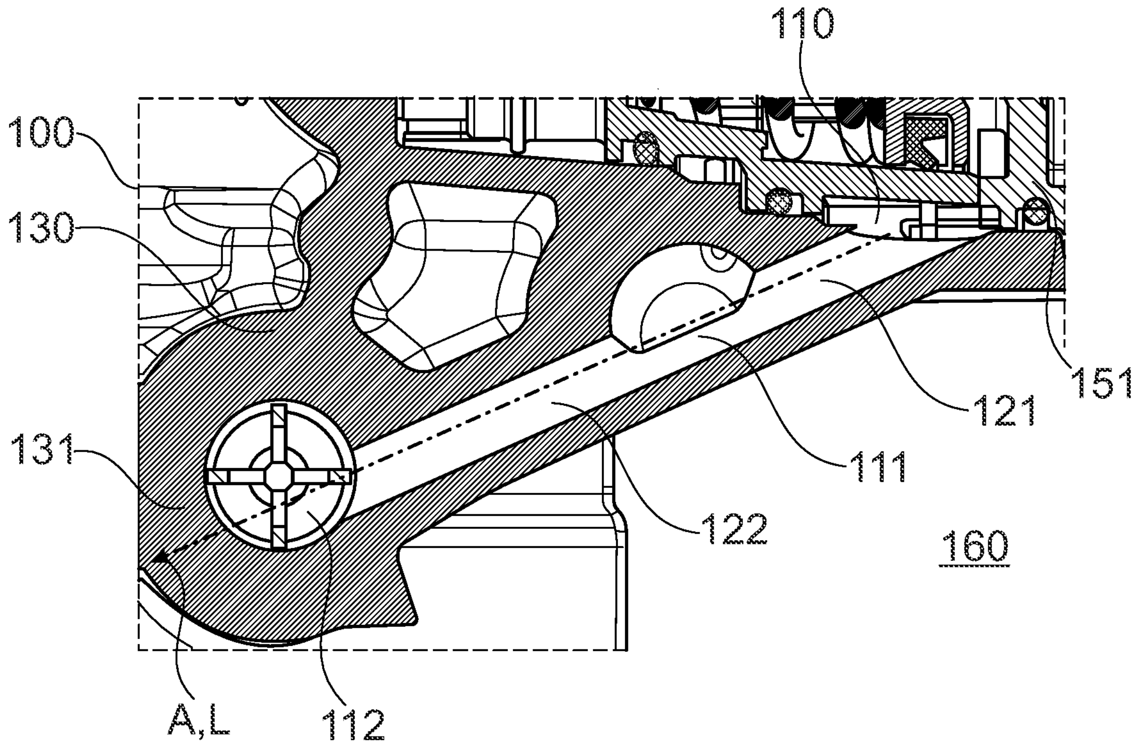
FIG. 3 is a sectional view of a tractor protection valve according to an embodiment of the disclosure.

FIG. 3 shows a sectional view of a tractor protection valve 100 according to an embodiment of the present disclosure. The tractor protection valve 100 of FIG. 3 is a tractor protection valve 100 for a trailer control module 150 of a vehicle 200*a*, 200*b* as explained with reference to FIG. 1. FIG. 3 is described under reference to FIG. 1.

The tractor protection valve 100 comprises a pressure chamber 110, a delivery port 111, and a control port 112. The pressure chamber 110, the delivery port 111, and the control port 112 are collinearly arranged. The pressure chamber 110, the delivery port 111 and the control port 112 are arranged at the same line L. The delivery port 111 is arranged between the pressure chamber 110 and the control port 112.

The tractor protection valve 100 comprises a first fluid channel 121 fluidly connecting the pressure chamber 110 and the delivery port 111 and a second fluid channel 122 fluidly connecting the delivery port 111 and the control port 112. Each of the first fluid channel 121 and the second fluid channel 122 extend along a common axis A. The common axis A coincides with the line L at which the pressure chamber 110 and the delivery port 111 and a second fluid channel 122 are arranged. The axis A may correspond to a principal flowing direction of pressurized air within each of the first fluid channel 121 and the second fluid channel 122.

The trailer control module 150 (not indicated in FIG. 3) includes a cover 151. The first fluid channel 121 and the second fluid channel 122 are arranged so that a body 130 of the tractor protection valve 130 and the cover 151 of the trailer control module 150 separates the fluid channels 121, 122 from an environment 160 of the trailer control module 150.

Figure 4:
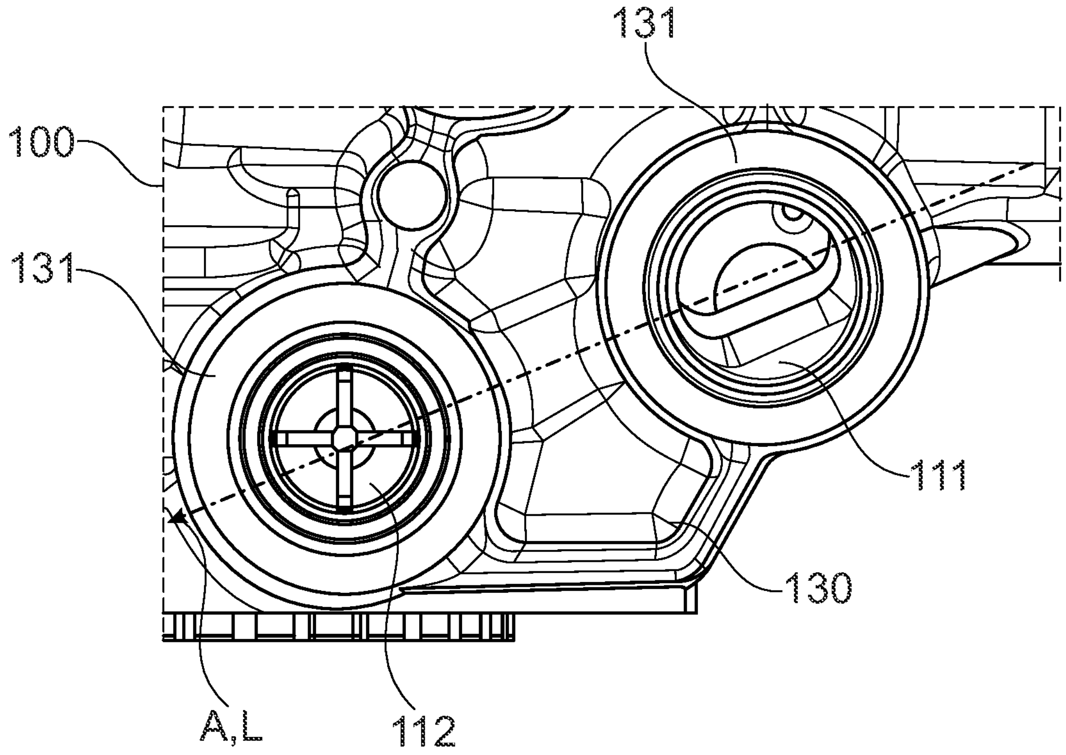
FIG. 4 is a detailed view of a tractor protection valve according to an embodiment of the disclosure.

FIG. 4 shows a detail of a tractor protection valve 100 according to an embodiment of the disclosure. The tractor protection valve 100 of FIG. 4 is the tractor protection valve 100 of FIG. 3. FIG. 4 is described under reference to FIG. 3.

The tractor protection valve 100 includes a body 130. The body 130 is made of cast aluminum alloy. The delivery port 111 and the control port 112 are arranged at an outer section 131 of the body 130. The outer section 131 of the body 130 is a surface section of the tractor protection valve 100. The outer section 131 may be accessed from the outside, e.g., for manufacturing and/or maintenance. The delivery port 111 and the control port 112 each have a circular contour with a specific radius to enable coupling of a pneumatic pipe to each of the ports 111, 112.

Figure 5:
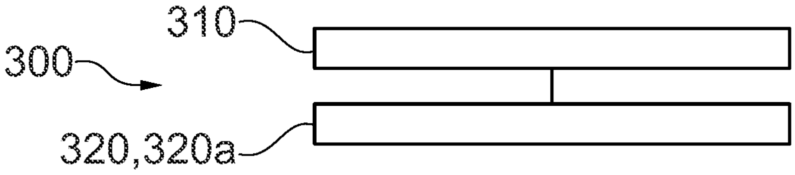
FIG. 5 shows a schematic chart of a method according to an embodiment of the present disclosure.

FIG. 5 shows a schematic chart of a method according to an embodiment of the disclosure. The method 300 of FIG. 5 is a method 300 of manufacturing the tractor protection valve 100 as described with reference to FIGS. 3 and 4. FIG. 5 is described under reference to FIGS. 3 and 4.

The method 300 according to FIG. 5 comprises the step of: providing 310 the tractor protection valve 100 with the pressure chamber 110, the delivery port 111 and the control port 112, wherein the pressure chamber 110, the delivery port 111 and the control port 112 are collinearly arranged.

The method 300 further comprises the step of: machining 320 the tractor protection valve 100 so that each of the first fluid channel 121 and the second fluid channel 122 extend along a common axis A.

The machining 320 comprises drilling 320*a*. Drilling 320*a* is performed in one step from the pressure chamber 110 via the delivery port 111 to the control port 112.

REFERENCE SIGNS (PART OF THE DESCRIPTION)

100 tractor protection valve
110 pressure chamber
111 delivery port
112 control port
113 second delivery port
114 exhaust port
121 first fluid channel
122 second fluid channel
130 body
131 outer section
100' prior art tractor protection valve
110' prior art pressure chamber
111' prior art delivery port
112' prior art control port
121' prior art first fluid channel
122' prior art second fluid channel
130' prior art body
150 trailer control module
151 cover
160 environment
200*a* vehicle
200*b* utility vehicle

200*c* tractor vehicle
300 method
310 providing
320 machining
320*a* drilling
A axis
A1, A2, A3 prior art drill axes
L line
T prior art triangle

The invention claimed is:

1. A tractor protection valve (100) for a trailer control module (150) of a vehicle (200*a*), wherein the tractor protection valve (100) comprises:
a pressure chamber (110);
a delivery port (111);
a control port (112);
a first fluid channel (121) fluidly connecting the pressure chamber (110) and the delivery port (111); and
a second fluid channel (122) fluidly connecting the delivery port (111) and the control port (112); wherein
the pressure chamber (110), the delivery port (111) and the control port (112) are collinearly arranged at a line (L); and
each of the first fluid channel (121) and the second fluid channel (122) extend along a common axis (A);
wherein the first fluid channel extends along a first linear direction between the pressure chamber and the delivery port, and the second fluid channel extends along a second linear direction between the control port and the delivery port, and the first and second linear directions are coaxial with the common axis.

2. The tractor protection valve (100) as claimed in claim 1, wherein
the tractor protection valve (100) includes a body (130), and
the delivery port (111) and the control port (112) are arranged at an outer section (131) of the body (130).

3. The tractor protection valve (100) as claimed in claim 2, wherein the delivery port (111) and the control port (112) each have circular contours and are sized and arranged for connection to respective pneumatic pipes.

4. The tractor protection valve as claimed in claim 1, wherein the common axis (A) coincides with the line (L).

5. The tractor protection valve as claimed in claim 4, wherein the common axis (A) corresponds to a principal flowing direction of pressurized air within each of the first fluid channel (121) and the second fluid channel (122).

6. The tractor protection valve as claimed in claim 1, wherein the delivery port (111) and the control port (112) extend perpendicular to the common axis (A).

7. The tractor protection valve (100) as claimed in claim 1, wherein
the delivery port (111) is arranged on the line (L) between the pressure chamber (110) and the control port (112).

8. A trailer control module (150) for a vehicle (200*a*) including the tractor protection valve (100) as claimed in claim 1.

9. The trailer control module (150) as claimed in claim 8, further comprising a cover (151) attached to a body (130) of the tractor protection valve (100).

10. A vehicle (200*a*) including the tractor protection valve (100) as claimed in claim 1.

11. A method (300) of manufacturing the tractor protection valve (100) as claimed in claim 1, wherein the method (300) comprises the steps of:
providing (310) the tractor protection valve (100) with the pressure chamber (110), the delivery port (111) and the control port (112), wherein the pressure chamber (110), the delivery port (111) and the control port (112) are collinearly arranged; and
machining (320) the tractor protection valve (100) and defining the first fluid channel (121) and the second fluid channel (122) so that each of the first fluid channel (121) and the second fluid channel (122) extend along a common axis (A).

12. The method (300) as claimed in claim 11, wherein the machining (320) includes drilling (320*a*).

13. The method (300) as claimed in claim 12, wherein the drilling (320*a*) is performed in one step and defines both the first channel (121) and the second fluid channel (122) in the one step.

14. The method (300) as claimed in claim 13, wherein the drilling is performed in a direction from the pressure chamber (110), through the delivery port (111), and to the control port (112).

15. The method (300) as claimed in claim 11, wherein the machining (32) includes a milling operation of a body (130) of the trailer protection valve (100), wherein the milling operation connects the delivery port (111) and the control port (112).

16. A trailer control module (150) for a vehicle (200*a*) including a tractor protection valve (100), wherein the tractor protection valve (100) comprises:
a pressure chamber (110);
a delivery port (111);
a control port (112);
a first fluid channel (121) fluidly connecting the pressure chamber (110) and the delivery port (111); and
a second fluid channel (122) fluidly connecting the delivery port (111) and the control port (112); wherein
the pressure chamber (110), the delivery port (111) and the control port (112) are collinearly arranged at a line (L); and
each of the first fluid channel (121) and the second fluid channel (122) extend along a common axis (A);
a cover (151) attached to a body (130) of the tractor protection valve (100);
wherein the first fluid channel (121) and the second fluid channel (122) are arranged within the body (130) of the tractor protection valve (130) and the cover (151) of the trailer control module (150) separates the first and second fluid channel (121, 122) from an environment (160) of the trailer control module (150).

* * * * *